US009124818B2

(12) United States Patent
Megawa

(10) Patent No.: US 9,124,818 B2
(45) Date of Patent: Sep. 1, 2015

(54) IMAGE ERASING APPARATUS AND METHOD FOR PROCESSING IMAGE ON SHEET

(71) Applicants: KABUSHIKI KAISHA TOSHIBA, Tokyo (JP); TOSHIBA TEC KABUSHIKI KAISHA, Tokyo (JP)

(72) Inventor: Shunichi Megawa, Shizuoka (JP)

(73) Assignees: Kabushiki Kaisha Toshiba, Tokyo (JP); Toshiba TEC Kabushiki Kaisha, Tokyo (JP)

( * ) Notice: Subject to any disclaimer, the term of this patent is extended or adjusted under 35 U.S.C. 154(b) by 34 days.

(21) Appl. No.: 14/069,788

(22) Filed: Nov. 1, 2013

(65) Prior Publication Data

US 2015/0124270 A1 May 7, 2015

(51) Int. Cl.
G06F 3/12 (2006.01)
H04N 1/32 (2006.01)
H04N 1/48 (2006.01)

(52) U.S. Cl.
CPC ............. *H04N 1/32133* (2013.01); *H04N 1/48* (2013.01); *H04N 2201/0081* (2013.01); *H04N 2201/0094* (2013.01); *H04N 2201/3269* (2013.01)

(58) Field of Classification Search
None
See application file for complete search history.

(56) References Cited

U.S. PATENT DOCUMENTS 8,243,292 B2 * 8/2012 Qian ............................ 358/1.12
8,259,941 B2 * 9/2012 Yanazume .................... 380/246
8,482,786 B2 * 7/2013 Ozawa ......................... 358/1.18
2012/0038941 A1 2/2012 Megawa
2012/0257264 A1 10/2012 Megawa
2013/0016376 A1 * 1/2013 Hashidume et al. ........... 358/1.9
2013/0070265 A1 * 3/2013 Megawa et al. ............... 358/1.9
2013/0070266 A1 * 3/2013 Hagiwara et al. ............. 358/1.9
2013/0070305 A1 3/2013 Tomizawa et al.
2013/0156458 A1 * 6/2013 Suzuki ............................ 399/81
2013/0235432 A1 * 9/2013 Shokai ........................ 358/3.28
2013/0250025 A1 * 9/2013 Kaneko et al. ................ 347/179
2013/0293931 A1 * 11/2013 Yasunaga et al. ............ 358/3.28
2014/0376008 A1 * 12/2014 Yamaguchi ................... 358/1.5

FOREIGN PATENT DOCUMENTS

JP 2006-268339 A 10/2006
JP 2007-178527 A 7/2007
JP 2010-262285 A 11/2010

OTHER PUBLICATIONS

U.S. Appl. No. 13/871,388, filed Apr. 26, 2013.

* cited by examiner

*Primary Examiner* — Dung Tran
(74) *Attorney, Agent, or Firm* — Patterson & Sheridan, LLP

(57) ABSTRACT

An image erasing apparatus includes a scanning unit configured to scan an image on a sheet and a mark printing area on the sheet where one or more marks may be printed, an erasing unit configured to erase the image from the sheet, a marking unit configured to put a mark on the sheet from which the image is erased, and a control unit. The control unit is configured to determine a number of the marks printed on the sheet based on the scanned mark printing area, determine an image area based on the scanned image, and determine a position of the mark to be put on the sheet by the marking unit based on the determined number of the marks and the determined image area.

20 Claims, 5 Drawing Sheets

IMAGE ERASING APPARATUS AND METHOD FOR PROCESSING IMAGE ON SHEET

FIELD

Embodiments described herein relate generally to an image erasing apparatus.

BACKGROUND

There is an image forming apparatus which prints an image on a sheet with an erasable coloring material for recycling of the sheet. In addition, there is an image erasing apparatus which erases an image printed with the erasable coloring material for reuse of the sheet and puts a mark showing the number of times erasing has been carried out on the sheet. However, the erasable coloring material remains on the sheet in a transparent state, even when the image formed with the erasable coloring material is erased by the erasing apparatus. If a coloring material of the mark is put on the erasable coloring material that remains, the coloring material of the mark may be repelled by the erasable coloring material.

DETAILED DESCRIPTION

In general, according to embodiments, an image erasing apparatus includes a scanning unit configured to scan an image on a sheet and a mark printing area on the sheet where one or more marks may be printed, an erasing unit configured to erase the image from the sheet, a marking unit configured to put a mark on the sheet from which the image is erased, and a control unit. The control unit is configured to determine a number of the marks printed on the sheet based on the scanned mark printing area, determine an image area based on the scanned image, and determine a position of the mark to be put on the sheet by the marking unit based on the determined number of the marks and the determined image area.

Hereinafter, the embodiment exemplary will be described.
(First Embodiment)

Figure 1:
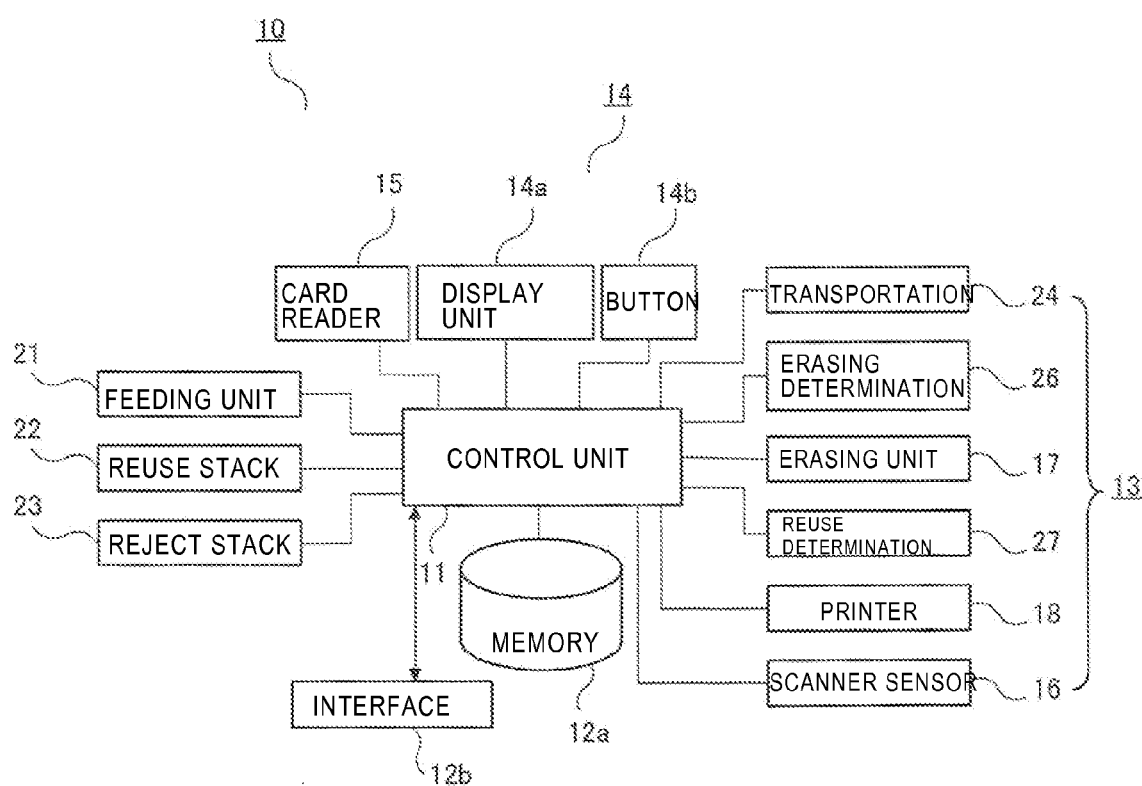
FIG. 1 is a schematic functional block diagram of an erasing apparatus according to a first embodiment.

FIG. 1 shows an erasing apparatus 10 which is an image erasing apparatus of a first embodiment. The erasing apparatus 10 includes a memory unit 12a and a control unit 11 that is a controller which controls the entire erasing apparatus 10. The control unit 11 is connected to an external interface (external I/F) 12b. The erasing apparatus 10 includes an erasing mechanism 13, a control panel 14, an IC card reader 15, a paper feeding unit 21, a reuse stack 22, and a reject stack 23.

The memory unit 12a stores data items of the erasing apparatus 10 such as a job history, the number of erased sheets, and the number of rejected sheets, and the like, with respect to each user, each part of users, each day, each week, each month, and the like. The memory unit 12a stores image data of erased images by relating the data to a job history, for example. The memory unit 12a stores image data, mark information, and the like, while in an erasing mode, for example.

The control panel 14 includes a touch-panel-type display unit 14a and a manipulation button 14b. The touch-panel-type display unit 14a displays a job mode which can be selected by a user, and a state of the erasing apparatus. A user manipulates the touch-panel-type display unit 14a or the manipulation button 14b to select a job mode.

The external I/F 12b is connected to a server or a Multi-Functional Peripheral (MFP) through a network. The IC card reader 15 is used for personal authentication of a user.

The paper feeding unit 21 feeds a sheet P, which is a recording medium, to the erasing mechanism 13 or a reject stack 23. The reuse stack 22 stores a reusable sheet P after the erasing mechanism 13 carries out an erasing process. The reject stack 23 stores a non-reusable sheet P.

The erasing mechanism 13 includes a scanner sensor 16, an erasing unit 17, a printer 18 (a marking unit), a transportation unit 24 which transports a sheet P, an erasing determination unit 26, and a reuse determination unit 27.

The erasing determination unit 26 includes a sensor for sensing a thickness of the fed sheet P or a foreign material, and when it is determined that an erasing process can be performed, the control unit 11 controls the erasing mechanism 13 to carry out the erasing process of the sheet P. When the erasing determination unit 26 determines that the erasing process on the sheet P cannot be performed, the control unit 11 controls the erasing mechanism 13 to transport the sheet P to the reject stack 23 without performing the erasing process.

Figure 2:
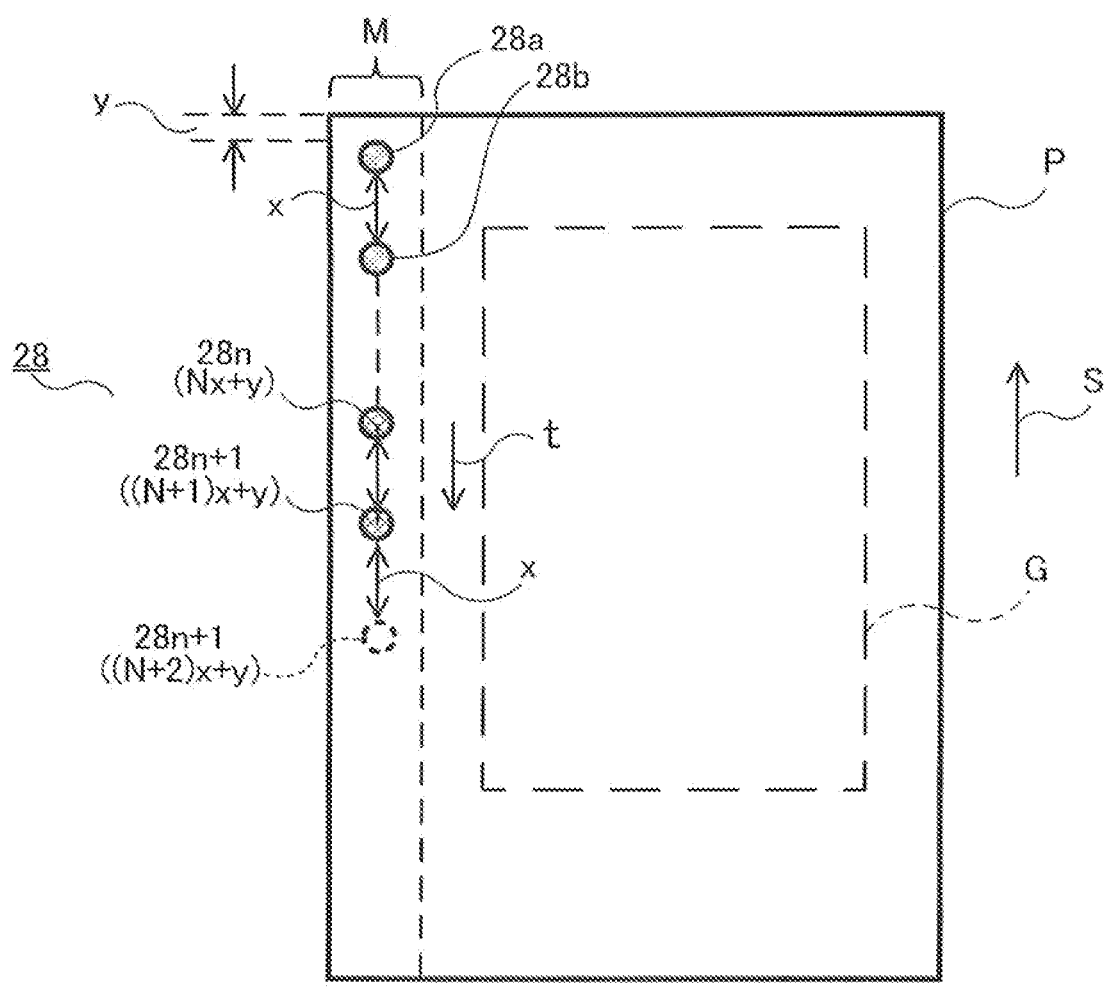
FIG. 2 is a schematic explanatory diagram showing a print image and a mark formed on a sheet to be processed by the erasing apparatus according to the first embodiment.

The scanner sensor 16 reads the sheet P. As shown in FIG. 2, a print image G is formed and a mark 28, which is a mark showing the number of erasing, is formed on the sheet P. The print image G is formed with, for example, an oil-based erasable toner, which is an erasable (color-erasable) coloring material. By heating the erasable toner, a color of an image can be erased. The mark 28 put on the sheet P is formed with, for example, a water-based ink, which is a mark coloring material. That is, the erasable coloring material and the mark coloring material are coloring materials having different properties and have properties to repel each other.

The scanner sensor 16 reads the print image G formed on the sheet P before the print image G is erased. The scanner sensor 16 reads the mark 28 put on the sheet P after the print image G is erased. The memory unit 12a stores image data of the print image G and information about mark showing the number of the mark 28, read by the scanner sensor 16.

The erasing unit 17 heats the print image G to erase the print image G formed on the sheet P. The erasing unit 17 heats the print image G at a temperature equal to or higher than a toner erasing temperature for erasing the erasable toner. The erasable toner is formed of a colorant, a colorable compound, and a color developing material in a binder resin, for example. If the print image G formed with the erasable toner is heated at a temperature equal to or higher than the toner erasing temperature, the colorable compound and the color developing material in the erasable toner are separated from each other, which causes erasing (erasing of the color) of the print image G.

The reuse determination unit 27 includes a sensor for sensing the sheet P after erasing of the print image G, and detects whether or not the print image G is removed and whether or not the sheet P is damaged. The control unit 11 determines reusability of the sheet P based on the detection of the reuse determination unit 27.

If the control unit 11 determines that the sheet P cannot be reused, the control unit 11 controls the erasing mechanism 13 to transport the sheet P to the reject stack 23. If the control unit 11 determines that the sheet P can be reused, the control unit 11 controls the erasing mechanism 13 to transport the sheet P to the printer 18.

The printer 18 is an ink jet printer which puts a mark with the water-based ink, for example. When the print image G on the sheet P is erased by the erasing unit 17, the printer 18 newly puts one circular mark 28, for example, on the sheet P. The number of marks 28 put on the sheet P denotes the number of times the print images on the sheet P are erased.

The printer 18 puts the mark 28 on a mark area M which is at one end of a front side of the sheet P and along with a direction s along which the scanner 16 scans the sheet. The printer 18 sequentially puts a mark 28$a$, 28$b$, ... 28$n$ ... with equivalent intervals x from a position that is a distance y apart from a top end of the sheet P. The control unit 11 set a position at which a new mark 28 is to be put. The control unit 11 sets a putting position of the N-th mark 28$n$, as (Nx+y), for example. The distance y and the interval x are not limited.

For setting the position for putting the new mark 28, the control unit 11 binarizes image data of the marks stored in the memory unit 12$a$ in accordance with a predetermined threshold value, to acquire the number of pixels corresponding to the marks. The control unit 11 labels the acquired number of pixels to acquire the number of pixel-connected components. The pixel-connected components are considered as the number of marks 28 formed on the sheet P. The labeling can be performed using a technology of the related art. For the labeling technology, a technology disclosed in JP-A-2006-268339 can be used, for example.

If the number of marks formed on the sheet P is N, the control unit 11 determines that n-th mark 28$n$ is put on the mark position (Nx+y). The control unit 11 controls the printer 18 so as to put a new mark 28$n$+1 on a predetermined position ((N+1) x+y) which is shifted along an arrow t direction by an interval x from the mark position (Nx+y).

For example, when the number of the marks 28 on the sheet P reached a maximum number for reusing the sheet P, the reuse determination unit 27 determines that the sheet P cannot be reused any more. If the marks 28 on the sheet P are printed up to the lower end of the mark area M, the reuse determination unit 27 may determine that the sheet P cannot be reused any more. In addition, for determining that the sheet P cannot be reused based on the number of marks 28 on the sheet P, a user may visually determine the number of marks 28.

If the print image G has been formed on the position ((N+1) x+y) and thus the erasable toner remains on the position, the control unit 11 shifts a position at which a new mark 28$n$+1 is to be put and controls the printer 18 to put the new mark 28$n$+1 at the shifted position. The control unit 11 determines whether or not the print image G is formed on the predetermined position ((N+1) x+y) based on the image data and the mark information stored in the memory unit 12$a$.

If the print image G is formed on the predetermined position ((N+1) x+y), the control unit 11 shifts the new mark 28$n$+1 to a next position ((N+2) x+y) and controls the printer 18 to put the new mark 28$n$+1 at the position ((N+2) x+y). The position ((N+2) x+y) is a position shifted along the arrow t direction by the interval x from the predetermined position ((N+1) x+y). The new mark 28$n$+1 is shifted to the next position ((N+2) x+y), to avoid the marks 28 of water-based ink from being put on the oil-based erasable toner. The new mark 28$n$+1 put on the position where the oil-based erasable toner is not formed can be absorbed into and dried on the sheet P.

For example, when the marks 28 of the water-based ink is put on the oil-based erasable toner, the water-based ink is repelled by the erasable toner and is not absorbed into the sheet P. If the sheet P is conveyed while the water-based ink stays on the erasable toner, the water-based ink may be adhered to the transportation unit 24 and may contaminate the transportation unit 24. Further, a sheet P may be stained by the water-based ink adhered to the transportation unit 24 transferring to the sheet P.

If the sheet P is transported while the water-based ink is not absorbed, the water-based ink may spread on the sheet P by contacting with the transportation unit 24 and bleeding of the marks 28 may be formed on the sheet P. If the transfer of the ink or bleeding of the marks 28 occur, when reusing the sheet P next time, the control unit 11 may incorrectly detect the marks 28.

Figure 3:
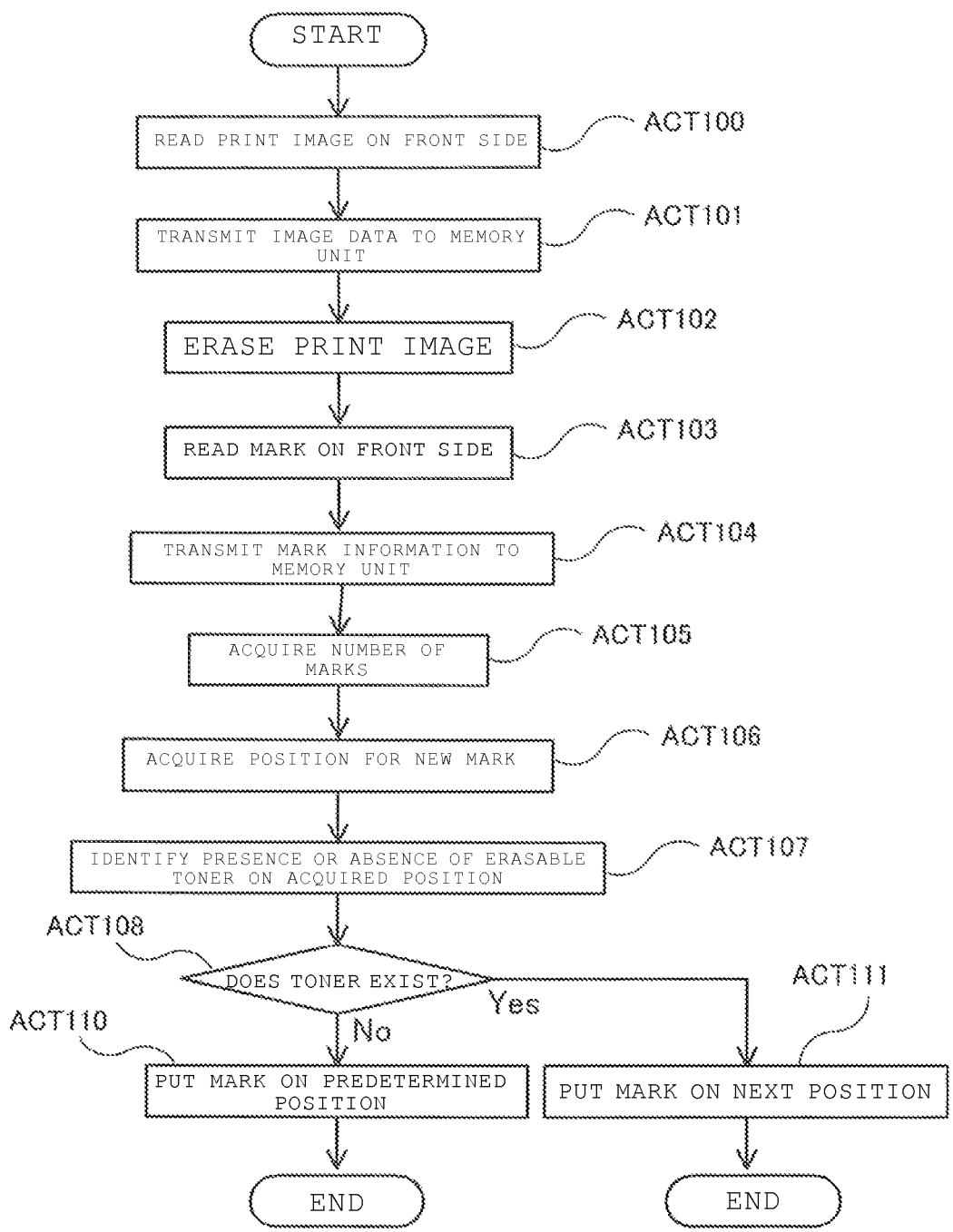
FIG. 3 is a schematic flowchart of a mark putting process carried out by the erasing apparatus according to the first embodiment.

A mark putting process for putting the marks 28 on the sheet P, after erasing of the print image G, will be described with reference to a flowchart of FIG. 3.

If the mark putting process is started, the control unit 11 controls the scanner sensor 16 to read the print image G formed on a front side of the sheet P before erasing of the print image G (ACT100). The control unit 11 transmits image data of the print image G formed on the front side to the memory unit 12$a$ (ACT101).

The control unit 11 controls the erasing unit 17 to erase the print images G on both sides of the sheet P (ACT102). After the erasing unit 17 erases the print image, the control unit 11 controls the scanner sensor 16 to read the marks 28 printed on the front side of the sheet P (ACT103). The control unit 11 transmits mark information of the read marks 28 to the memory unit 12$a$ (ACT104).

The control unit 11 acquires the number of marks (number of erasing) based on the mark information (ACT105). The control unit 11 acquires the position ((N+1) x+y) for putting the new mark 28$n$+1 based on the acquired number of marks (ACT106). The control unit 11 identifies whether or not the erasable toner exists on the position ((N+1) x+y) by comparing the image data and the acquired position ((N+1) x+y) (ACT107).

The control unit 11 determines whether or not the erasable toner exists on the position ((N+1) x+y) (ACT108). If the erasable toner does not exist on the position ((N+1) x+y) (ACT108; No), the control unit 11 controls the printer 18 to put the new mark 28$n$+1 on the position ((N+1) x+y) (ACT110), and the mark putting process is ended.

If the erasable toner exists on the position ((N+1) x+y) (ACT108; Yes), the control unit 11 controls the printer 18 to put the new mark 28$n$+1 on the next position ((N+2) x+y) (ACT111), and the mark putting process is ended.

According to the first embodiment, the control unit 11 sets the position ((N+1) x+y) on the sheet P for putting the new mark 28$n$+1, every time erasing the print image G on the sheet P. If the erasable toner exists on the position ((N+1) x+y), the control unit 11 controls the printer 18 to shift and put the new mark 28$n$+1 on the next position ((N+2) x+y).

The new mark 28$n$+1 of the water-based ink is put on the sheet P, so that the new mark 28$n$+1 does not overlap the position where the oil-based erasable toner used for the print image G remains. The new mark 28$n$+1 put on an area of the sheet P without the erasable toner is absorbed into the sheet P. The new mark 28$n$+1 properly put on the sheet P is not likely to contaminate the transportation unit 24. The sheet P is prevented from being contaminated by transfer of the water-based ink from the transportation unit 24 or bleeding of the new mark 28*n*+1 caused by the contact with the transportation unit 24.

In the first embodiment, for avoiding the oil-based erasable toner, the direction along which the position of the mark 28 of the water-based ink is shifted may be a direction perpendicular to a direction along which the scanner sensor 16 scans the sheet P (shown by an arrow s in FIG. 2). In addition, the material used to form the print image and the material used to put the mark are not limited, as long as the material used for the put mark is repelled by the material used for the print image.

(Second Embodiment)

Figure 4:
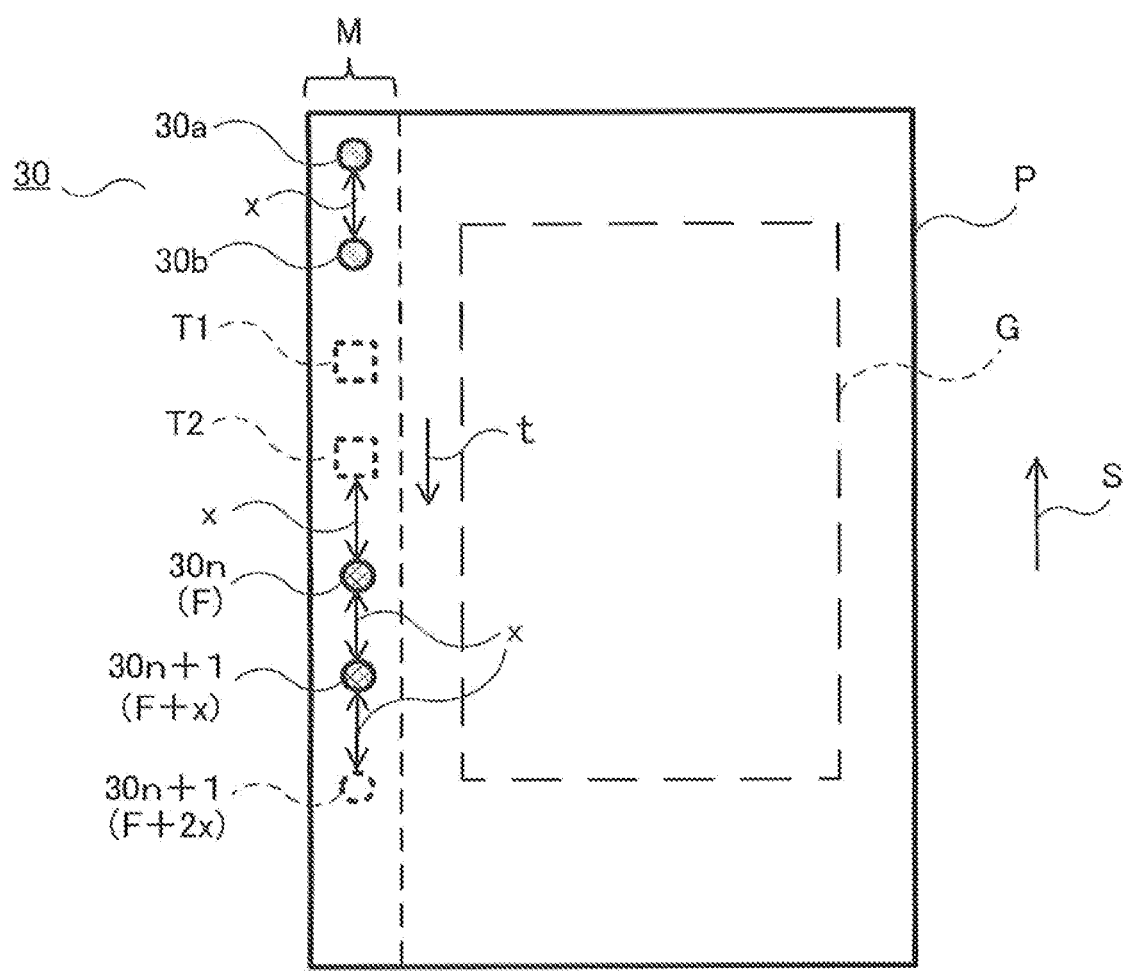
FIG. 4 is a schematic explanatory diagram showing a print image and a mark formed on a sheet to be processed by an erasing apparatus according to a second embodiment.

A second embodiment will be described. A method of acquiring a position for putting the new mark of the second embodiment is different from that of the first embodiment. In the second embodiment, configurations which are the same as the configurations described in the first embodiment are given the same reference numerals and the detailed description thereof is omitted. As shown in FIG. 4, a print image G and marks 30 (30*a*, 30*b*, . . . 30*n*) are put on the sheet P in the second embodiment, for example.

The scanner sensor 16 scans from an upper end and a lower end of the mark area M on the sheet P, which is the entire area of the mark area M, in the scanning direction s, after erasing of the print image G, to read the marks 30. The control unit 11 acquires the number of marks and a position F of a final mark (final mark position), from mark information of the marks 30 read by the scanner sensor 16. The final mark position F is acquired by extracting the pixel-connected components using the labeling technology described in the first embodiment. That is, among the extracted pixel-connected components, the pixel-connected component separated farthest from a mark starting position is set as a final mark and shown by a coordinate value F.

The control unit 11 determines that an N-th mark 30*n* is put on the final mark position F. Accordingly, the control unit 11 controls the printer 18 so as to put a new mark 30*n*+1 on a predetermined position (F+x) shifted along the arrow t direction by the interval x from the final mark position F.

If the print image G has been formed in a position T1 and a position T2 in which are prepared to put the marks 30, n marks are formed on the sheet P without marks in the position T1 and the position T2. The control unit 11 avoids putting a new mark 30*n*+1 on the position T1 and the position T2 where the erasable toner remains.

If the print image G has been formed on the predetermined position (F+x) for putting the new mark 30*n*+1, the control unit 11 controls the printer 18 to shift the position for the new mark 30*n*+1. The control unit 11 determines whether or not the print image G is formed on the position (F+x) based on the image data and the mark information stored in the memory unit 12*a*.

If the print image G has been formed and the erasable toner remains on the position (F+x), the control unit 11 controls the printer 18 to put the new mark 30*n*+1 on the next position (F+2x). The next position (F+2x) is a position shifted along the arrow t direction by the interval x from the predetermined position (F+x). The new mark 30*n*+1 is shifted to the next position (F+2x) so that the printer 18 does not put the marks 30 of the water-based ink on the oil-based erasable toner. The new mark 30*n*+1 put on the position where the oil-based erasable toner is not formed is absorbed into and dried on the sheet P.

Figure 5:
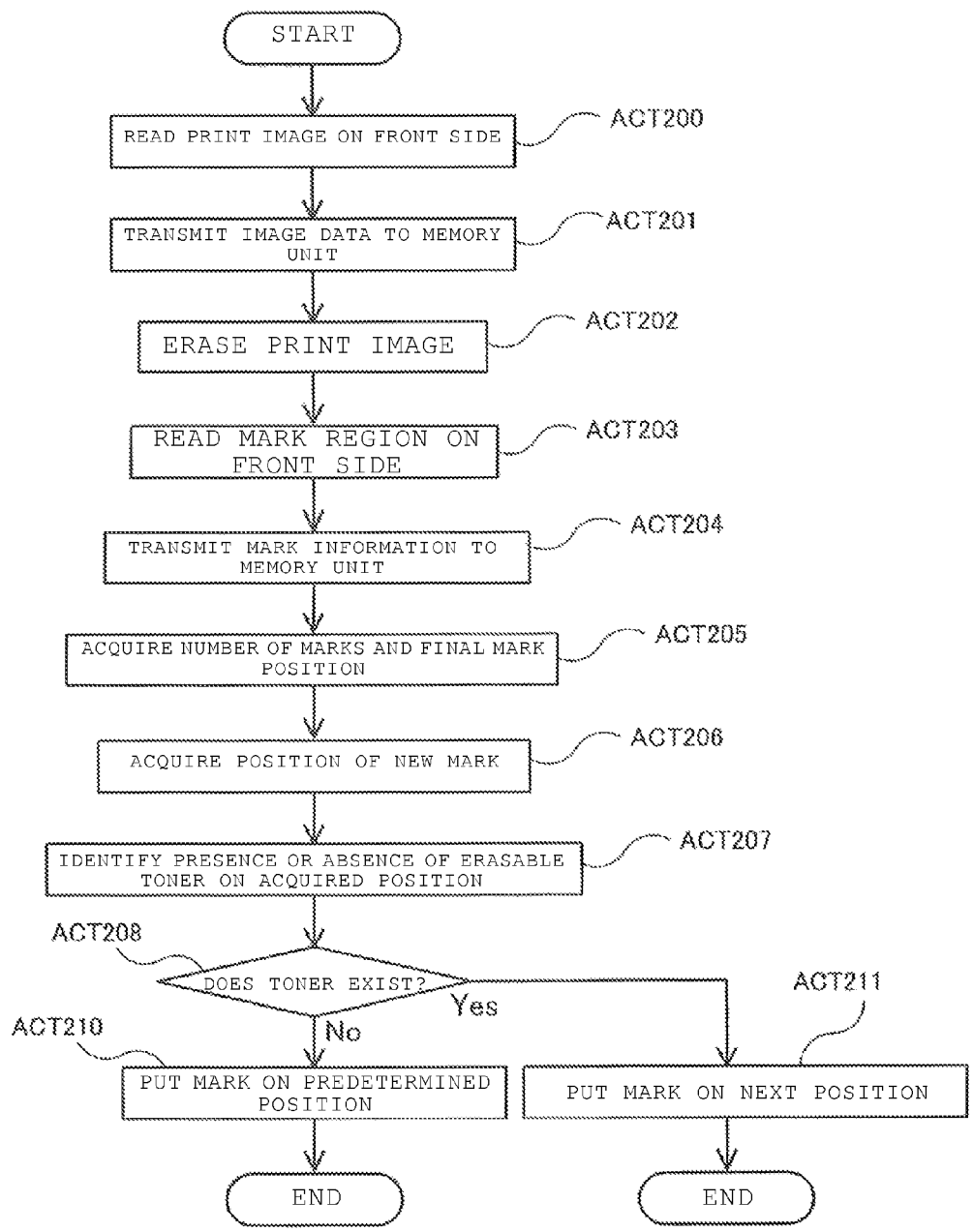
FIG. 5 is a schematic flowchart of a mark putting process carried out by the erasing apparatus according to the second embodiment.

A mark putting process of the erasing apparatus 10 will be described with reference to a flowchart of FIG. 5. If the putting manipulation is started, the control unit 11 controls the scanner sensor 16 to read the print image G formed on a front side of the sheet P before erasing of the print image G (ACT200). The control unit 11 transmits image data of the print image G formed on the front side of the sheet P to the memory unit 12*a* (ACT201).

The control unit 11 controls the erasing unit 17 to erase the print images G on both sides of the sheet P (ACT202). After the erasing unit 17 erases the print image, the control unit 11 controls the scanner sensor 16 to read the mark area M on the front side of the sheet P from the upper end to the lower end (ACT203). The control unit 11 transmits mark information of the read mark area M to the memory unit 12*a* (ACT204).

The control unit 11 acquires the number of marks and the final mark position F put on the area M, based on the mark information (ACT205). The control unit 11 acquires the position (F+x) for putting the new mark 30*n*+1 based on the acquired final mark position F (ACT206). The control unit 11 identifies whether or not the erasable toner exists on the position (F+x) by comparing the image data and the acquired position (F+x) (ACT207).

The control unit 11 determines whether or not the erasable toner exists on the position (F+x) (ACT208). If the erasable toner does not exist on the position (F+x) (ACT208; No), the control unit 11 controls the printer 18 to put the new mark 30*n*+1 on the position (F+x) (ACT210), and the mark putting process is ended.

If the erasable toner exists on the position (F+x) (ACT208; Yes), the control unit 11 controls the printer 18 to put the new mark 30*n*+1 on the next position (F+2x) (ACT211), and the mark putting process is ended.

According to the second embodiment, the scanner sensor 16 scans the mark area M which is one end of the front side of the sheet P, from the upper end to the lower end, every time the print image G on the sheet P is erased. The control unit detects the final mark position F based on the mark information of the mark area M. The control unit 11 sets the position (F+x) on the sheet P for putting the new mark 30*n*+1 from the final mark position F. If the erasable toner exists on the position (F+x), the control unit 11 controls the printer 18 to shift and put the new mark 30*n*+1 on the next position (F+2x).

The new mark 30*n*+1 of the water-based ink is put on the sheet P, so that the new mark 30*n*+1 does not overlap the position where the oil-based erasable toner used for the print image G remains. The new mark 30*n*+1 put on an area of the sheet P without the erasable toner is absorbed into the sheet P. The new mark 30*n*+1 properly put on the sheet P is not likely to contaminate the transportation unit 24. The sheet P is prevented from being contaminated by transfer of the water-based ink to the sheet P from the transportation unit 24 or bleeding of the new mark 30*n*+1 caused by the contact with the transportation unit 24. The control unit 11 is prevented from erroneously detecting the mark 30 when detecting an adjacent mark 30, due to the contamination of the sheet P. The control unit 11 avoids putting the new mark 30*n*+1 on the position T1 and the position T2 where the erasable toner formed previously remains. The transportation unit 24 is prevented from being contaminated by repelling of the ink of the new mark 30*n*+1 due to the erasable toner previously formed on the sheet P. The sheet P is prevented from being contaminated by transfer of the ink or bleeding of the new mark 30*n*+1 by the repelling of the ink of the new mark 30*n*+1 due to the erasable toner previously formed on the sheet P.

In the second embodiment, for example, when a maximum number of reusing the sheet P is set and the number of marks read by the scanner sensor 16 exceeds the maximum number, the reading of the sheet P by the scanner sensor 16 may be stopped.

According to at least one embodiment, the contamination of the transporting unit due to the repelling of the ink used for putting the marks by the erasable toner is prevented. The contamination of the sheet due to the transfer of the ink to the sheet from the transporting unit or scrape of the ink on the sheet is prevented.

The erasing apparatus is not limited to the specific configuration described in the embodiment, and for example, an apparatus including a unit which prints a read image on a sheet may be used. An apparatus including a unit having a function to print an image on a sheet based on image data or the like is also defined as an erasing apparatus according to the embodiment.

While certain embodiments have been described these embodiments have been presented by way of example only, and are not intended to limit the scope of the inventions. Indeed, the novel apparatus and methods described herein may be embodied in a variety of other forms: furthermore various omissions, substitutions and changes in the form of the apparatus and methods described herein may be made without departing from the spirit of the inventions. The accompanying claims and there equivalents are intended to cover such forms of modifications as would fall within the scope and spirit of the invention.

What is claimed is:

1. An image erasing apparatus comprising:
   a scanning unit configured to scan an image on a sheet and a mark printing area on the sheet;
   an erasing unit configured to erase the image from the sheet;
   a marking unit configured to print a mark on the sheet; and
   a control unit configured to:
      determine a number N of the marks printed on the sheet from scan results of the mark printing area scanned by the scanning unit,
      determine an image position from scan results of the image scanned by the scanning unit, and
      determine a position of the mark to be printed on the sheet by the marking unit, wherein the determined position is at a first position $((N+1)*x)+y$ or at a second position $((N+2)*x)+y$, depending on the determined image position, where x is a predetermined interval between the printed marks and y is a predetermined distance from the first mark to an edge of the sheet.

2. The image erasing apparatus according to claim 1, wherein the control unit is configured to determine the position of the mark to be printed on the sheet such that the mark does not overlap the determined image position.

3. The image erasing apparatus according to claim 1, wherein the first position is at a predetermined distance apart from the Nth mark printed on the sheet, and the second position is twice the predetermined distance apart from the Nth mark printed on the sheet.

4. The image erasing apparatus according to claim 3, wherein the determined position is the predetermined distance apart from the Nth mark printed on the sheet in a direction along a long side of the sheet.

5. The image erasing apparatus according to claim 3, wherein the determined position is the predetermined distance apart from the Nth mark printed on the sheet in a direction along which the scanning unit scans the image on the sheet.

6. The image erasing apparatus according to claim 5, wherein the control unit is configured to control the marking unit to not print the mark when the determined position is not on the sheet.

7. The image erasing apparatus according to claim 6, further comprising:
   a storing unit configured to store a sheet,
   wherein the control unit is configured to control conveyance of the sheet to the storing unit when the control unit causes the mark to be not printed on the sheet.

8. The image erasing apparatus according to claim 1, wherein the mark to be printed and the marks printed on the sheet are printed with a material that cannot be erased by the erasing unit.

9. An image erasing apparatus comprising:
   a scanning unit configured to scan an image on a sheet and a mark printing area on the sheet where N marks are printed;
   an erasing unit configured to erase the image from the sheet;
   a marking unit configured to print a mark on the sheet from which the image is erased; and
   a control unit configured to:
      determine a position of the Nth mark printed on the sheet based on scan results of the mark printing area scanned by the scanning unit,
      determine an image position based on scan results of the image scanned by the scanning unit, and
      determine a position of the mark to be printed on the sheet by the marking unit, wherein the determined position is at a first interval from the Nth mark or at a second interval from the Nth mark, depending on the determined image position.

10. The image erasing apparatus according to claim 9, wherein the control unit is configured to determine the position of the mark to be printed on the sheet such that the mark does not overlap the determined image position.

11. The image erasing apparatus according to claim 9, wherein the first interval is at a predetermined distance apart from the Nth mark printed on the sheet, and the second interval is twice the predetermined distance apart from the Nth mark printed on the sheet.

12. The image erasing apparatus according to claim 9, wherein the determined position of the mark to be printed on the sheet is a predetermined distance apart from the determined position of the Nth mark printed on the sheet.

13. The image erasing apparatus according to claim 12, wherein the determined position of the mark to be printed on the sheet is the predetermined distance apart from the determined position of the Nth mark printed on the sheet in a direction along a long side of the sheet.

14. The image erasing apparatus according to claim 12, wherein the determined position of the mark to be printed on the sheet is the predetermined distance apart from the determined position of the Nth mark printed on the sheet in a direction along which the scanning unit scans the image on the sheet.

15. The image erasing apparatus according to claim 14, wherein the control unit is configured to control the marking unit to not print the mark when the determined position is not on the sheet.

16. The image erasing apparatus according to claim 15, further comprising:
   a storing unit configured to store a sheet,
   wherein the control unit is configured to control conveyance of the sheet to the storing unit when the control unit causes the mark to be not printed on the sheet.

17. The image erasing apparatus according to claim 9, wherein the mark to be printed and the marks printed on the sheet are printed with a material that cannot be erased by the erasing unit.

18. A method for processing an image printed on a sheet, comprising:
- scanning the image on a sheet and a mark printing area on the sheet;
- erasing the image from the sheet;
- determining a position of an Nth mark printed on the sheet using the scanned mark printing area;
- determining an image area using the scanned image;
- determining a position of a mark to be printed on the sheet, wherein the determined position is at a first interval from the Nth mark or at a second interval from the Nth mark, depending on the determined image position; and
- printing the mark at the determined position on the sheet.

19. The method according to claim 18, wherein the position of the mark to be printed on the sheet is determined so that the mark does not overlap the determined image area.

20. The method according to claim 18, wherein the determined position of the mark to be printed on the sheet is a predetermined distance apart from the determined position of the Nth mark printed on the sheet.

* * * * *